United States Patent
Iwai

(10) Patent No.: US 6,943,806 B2
(45) Date of Patent: Sep. 13, 2005

(54) PORTABLE INFORMATION TERMINAL APPARATUS

(75) Inventor: Kiyoshi Iwai, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 316 days.

(21) Appl. No.: 09/919,611

(22) Filed: Aug. 1, 2001

(65) Prior Publication Data

US 2002/0024480 A1 Feb. 28, 2002

(30) Foreign Application Priority Data

Aug. 1, 2000 (JP) ........................................ 2000-232710

(51) Int. Cl.$^7$ ................................................ G09G 5/00
(52) U.S. Cl. ........................................ 345/593; 345/211
(58) Field of Search ........................ 455/556.1, 556.2, 455/566, 574; 345/589, 593, 594, 211, 212, 102, 213, 87; 348/730

(56) References Cited

U.S. PATENT DOCUMENTS

| | | | | |
|---|---|---|---|---|
| 5,390,293 A | * | 2/1995 | Nishioka et al. | 345/593 |
| 5,859,594 A | * | 1/1999 | King et al. | 340/7.55 |
| 6,140,986 A | * | 10/2000 | Wilkinson et al. | 345/589 |
| 6,304,763 B1 | * | 10/2001 | Jahagirdar et al. | 455/566 |
| 6,377,818 B2 | * | 4/2002 | Irube et al. | 455/556.1 |
| 6,438,392 B1 | * | 8/2002 | Toba | 455/566 |
| 6,466,202 B1 | * | 10/2002 | Suso et al. | 455/566 |

FOREIGN PATENT DOCUMENTS

JP        2000089208 A        3/2000

* cited by examiner

Primary Examiner—Chanh Nguyen
(74) Attorney, Agent, or Firm—Sughrue Mion, PLLC

(57) ABSTRACT

In a portable information terminal apparatus, the contents of data to be processed for display are checked, and a number of colors to be displayed is decided in accordance with the contents of the data. For example, to display only character data, a display processing for a monochrome display is performed by driving the light emitting circuit of a monochrome. For displaying image data, a display processing for a multi-color display is performed by driving the light emitting circuit of a multi-color.

5 Claims, 4 Drawing Sheets

PORTABLE INFORMATION TERMINAL APPARATUS

BACKGROUND OF THE INVENTION

1. Field of the Invention

This invention relates to a portable information terminal apparatus having the functions of displaying transmitting and receiving data.

2. Description of the Related Art

Conventionally, for displaying various kinds of transmitting and receiving data, a portable information terminal apparatus typified by a portable telephone normally incorporates a monochrome display unit utilizing a display device such as an LCD (Liquid Crystal Display), an EL (Electro luminescence) that is a self-emitting device, or an LED (Light Emitting Diode). However, in recent years, image data such as pictures and moving images can be transmitted easily, leading to a gradually growing demand for a full-color display in the terminal apparatus.

In order to fulfill such demands, a terminal apparatus having a display unit composed of a color LCD driven by TFTs (Thin Film Transistors) has been developed. However, in general, a color display unit requires a large amount of electric power to be driven. For this reason there has been a problem that when a terminal apparatus incorporating a color display unit is driven only by batteries, it can only be used for a short time per each charging period. This use time is shorter than the time available if a monochrome terminal apparatus is used.

To solve the above-mentioned problem, technology for such a terminal apparatus is disclosed in Japanese Patent Laid-Open Publication No. Hei. 10-200960. The terminal apparatus disclosed in the publication includes a display unit capable of displaying character data on a monochrome LCD panel and displaying image data on a color LCD panel, selectively, to reduce electric power consumption by the apparatus.

However, as for a portable information terminal apparatus typified by a portable telephone, there are strict requirements for the casing to be compact so that when used it is convenient. Therefore, when the casing incorporates a plurality of display units, the casing size will be enlarged contrary to the requirement for compactness. Then, if the size of screen for the display unit is reduced so as to reduce the bulk of the casing that incorporates a plurality of display units, the display instead loses its clarity and visibility.

OBJECTS AND SUMMARY OF THE INVENTION

The present invention has been conceived to solve the above mentioned problems. That is, it is an object of the present invention to provide a portable information terminal apparatus incorporating one display unit capable of displaying transmitted and received data in full-color and monochrome. In addition, another object of the present invention is to provide a portable information terminal apparatus capable of extending an operation time by reducing electric power consumption of the apparatus.

The portable information terminal apparatus according to the present invention includes a communication part for transmitting and receiving signals by utilizing a radio channel, a display mode selection part for selecting a display mode in which contents of data contained in said signals are displayed with one or more display colors, a display color selection part for selecting an allowable number of the display colors to be used, when the contents of data are displayed in accordance with a selection result by the display mode selection part, and a data display part for displaying the contents of data in the display mode selected by the display mode selection part, and with the selected allowable number of the display colors selected by the display color selection part.

DETAILED DESCRIPTION OF THE PREFERRED EMBODIMENTS

Figure 1:
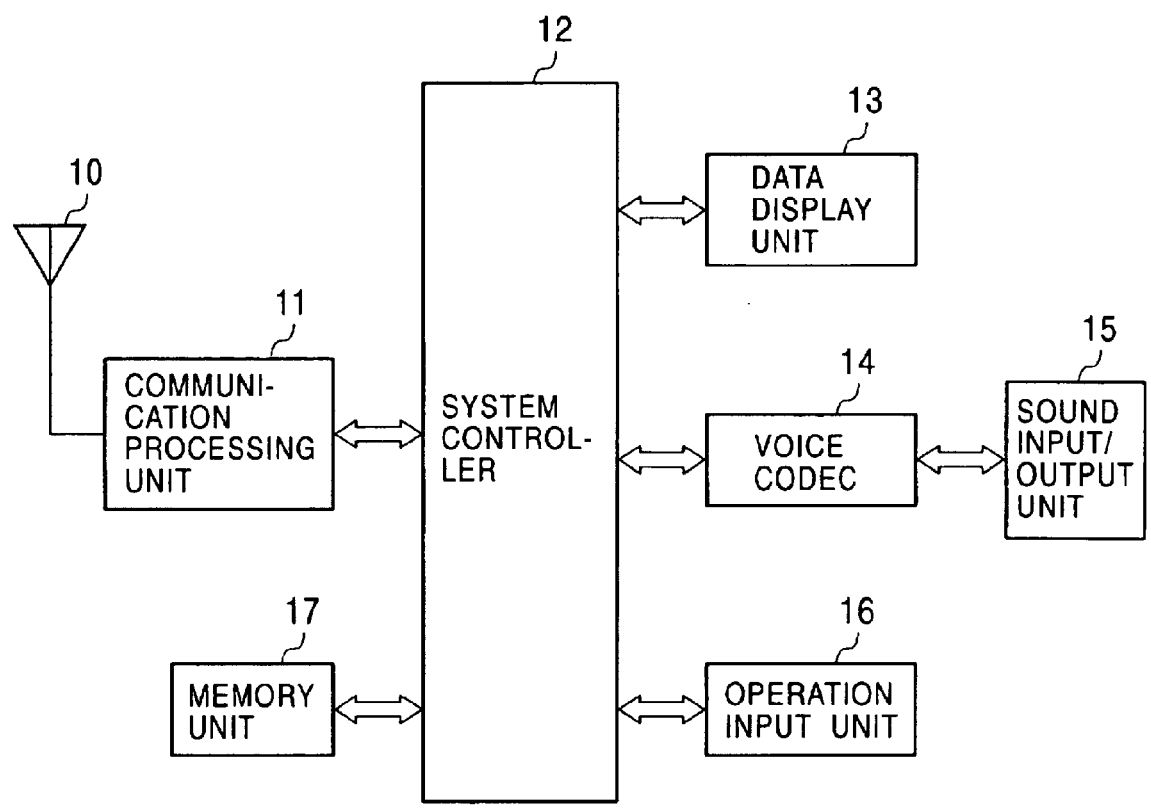
FIG. 1 is a block diagram of an embodiment of a portable information terminal apparatus according to the present invention.

FIG. 1 is a block diagram of an embodiment of a portable information terminal apparatus according to the present invention. In FIG. 1, a receiving antenna 10 is a small size high gain antenna such as a rod antenna or a dielectric antenna, and transmits radio waves to, and receives radio waves from base stations or other portable information terminal apparatuses.

A communication processing unit 11 is a circuit for performing data communication processing in the portable information terminal apparatus. The communication processing unit 11 performs communication processing such as transmission/modulation of transmitting signals, and detection/demodulation or error correction of receiving signals, all of which are necessary for transmitting and receiving data.

A system controller 12 mainly includes a microcomputer ($\mu$CPU, hereinafter) and controls operations of the whole apparatus. The system controller 12 executes a main program for this apparatus and various subprograms, such as a subroutine for data display to be described later, all of which are stored in a memory unit 17 and are synchronized with an internal clock.

The memory unit 17 includes memory elements such as a ROM (Read Only Memory) and a RAM (Random Access Memory). The ROM stores various programs that control the operation of the apparatus as mentioned above. The RAM temporarily stores various values calculated during operation processing in the apparatus and various status flags that are criteria for deciding the operation processing to be carried out in the apparatus.

Figure 2:
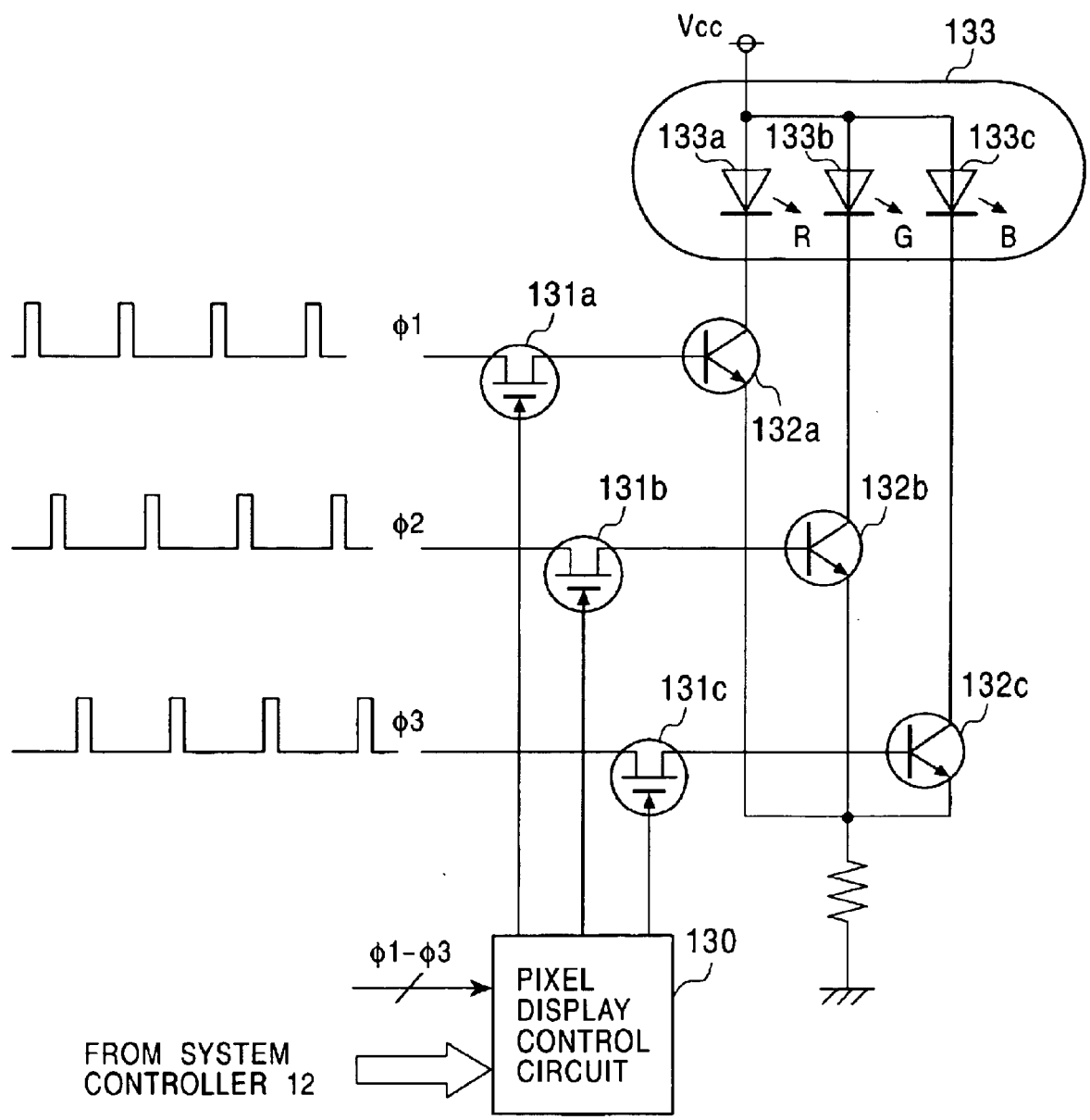
FIG. 2 is a circuit diagram of a pixel constituting a data display unit 13 of the apparatus shown in FIG. 1, partly shown in a block diagram.

A data display unit 13 includes display elements such as a TFT-driven LCD, an organic EL or an LED, and displays transmitting/receiving data. Variations on a circuit diagram per pixel in the data display unit 13 have been proposed. For example, a circuit diagram constituting a pixel using light emitting devices for displaying in three primary colors, red, green and blue is shown in FIG. 2. Incidentally, in FIG. 2, each light emitting device is expressed as an LED for explanatory convenience. Each of these light emitting devices can be preferably replaced by a light transmissive liquid crystal cell for each color or a pixel of an organic EL matrix panel for each color.

In FIG. 2, an LED 133 is a common anode type LED constituting a pixel of a display screen of the data display unit 13. In the LED 133, a red light emitting diode 133a, a green light emitting diode 133b and a blue light emitting diode 133c are formed in a same pellet. Forward current passes through each of the LEDs 133a to 133c when transistors that are connected to the respective cathode terminals of the LEDs are turned on. Then, each LED independently emits its corresponding light of a red, green or blue color. Therefore, color display in a pixel can be performed by combining ON/OFF statuses of the transistors.

Transistors 132a to 132c are drive transistors for driving the LEDs 133a to 133c respectively. FETs 131a to 131c are switching elements for supplying a three phase clock, $\phi 1 \sim \phi 3$, consisting of trigger pulse to the respective bases of the transistors 132a to 132c. A pixel display control circuit 130 receives a control signal from the system controller 12 and then controls the switching operation of the FETs 131a to 131c, synchronized with the three phase clock, $\phi 1 \sim \phi 3$.

A voice Codec 14 is an analog-to-digital and digital-to-analog conversion circuit for converting the sound signals inputted to and outputted from the apparatus. A sound input/output unit 15 performs sound conversion of sound information that is actually inputted to and outputted from the apparatus through such sound transducing devices as a microphone or a speaker.

It should be noted that the voice Codec 14 and the sound input/output unit 15 are not indispensable components in this apparatus. For example, portable information terminal apparatuses such as a portable POS terminal that do not need to perform sound inputting and outputting, do not need these components to be mounted on the system.

An operation input unit 16 is used for inputting various operation controls, data and the like to the apparatus and is composed of a keyboard or various switches.

Display processing of transmitting/receiving data in the apparatus will be explained with reference to the flow chart shown in FIG. 3.

Figure 3:
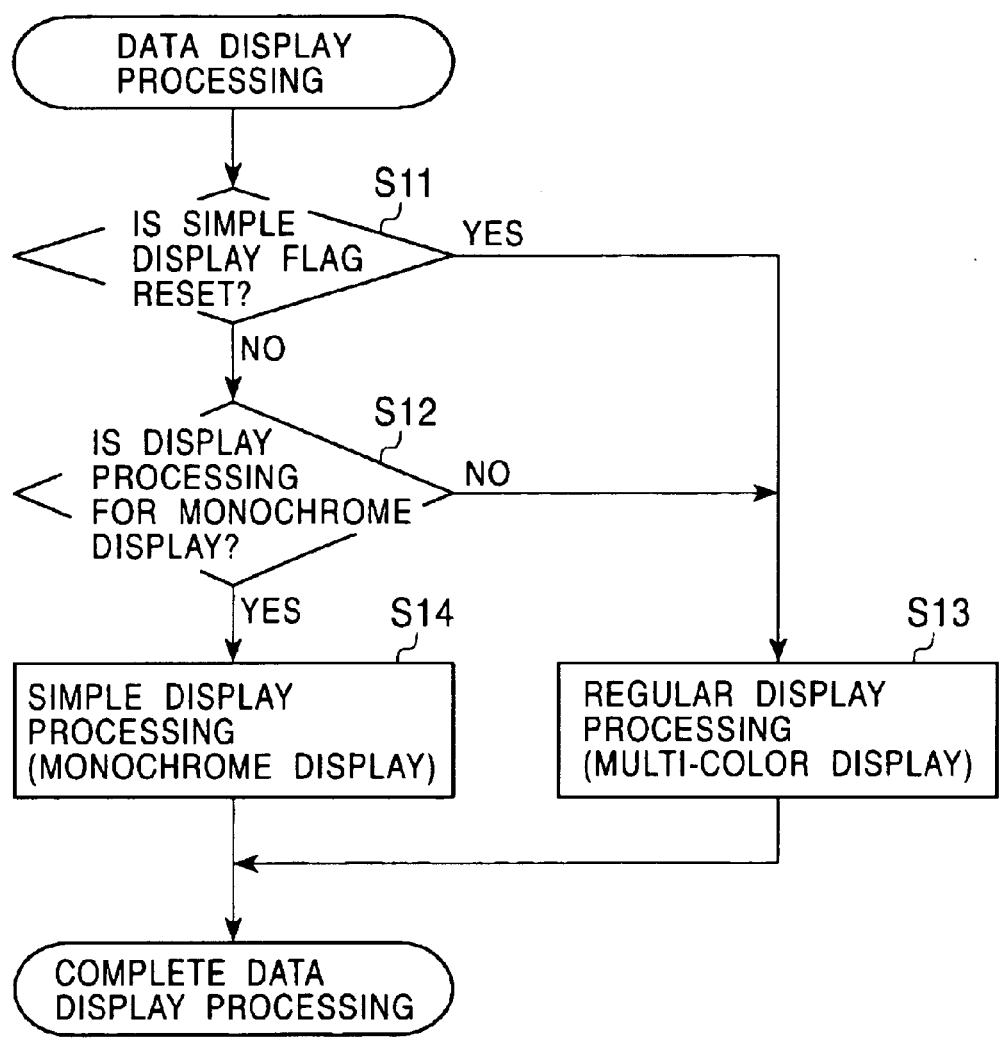
FIG. 3 is a flowchart of a data display process in the apparatus in FIG. 1.

The system controller 12 executes a data display processing subroutine indicated in the flow chart of FIG. 3. The system controller 12 executes the subroutine, interrupting the main routine (not shown), continuously in synchronization with the internal clock. This subroutine, for example, may be executed by sending a command thereto for prompting a data display through the keyboard of the operation input unit 16. Or, this subroutine may be executed by the data display command contained in transmitting/receiving data. Or again, this subroutine may be executed by the command combining the above-mentioned two operations.

In this subroutine, the system controller 12 first detects whether a simple display flag is set or reset at step 11. The simple display flag is used for deciding whether or not a monochrome display is displayed on the data display unit 13. The status of this flag can be set or reset through the keyboard operation or function key operation performed in the operation input unit 16. In this embodiment, when the above-mentioned flag is reset, the monochrome display for saving electric power is not performed. Therefore, when the flag is reset the data displays for all of the data display processing are performed in so-called full-color using a plurality of colors (step 13).

In this case, the display operation in a pixel described in FIG. 2 is subject to the regular full-color display operation. That is, the pixel display control circuit 130 controls the switching operation of the clock pulses by utilizing the FETs 131a to 131c in accordance with the control signal from the system controller 12. Specifically, by this switching operation of the respective FETs, the periods of the three phase clock supplied to the base terminals of the transistors are made different from each other. Therefore, the turn-on time of the transistors 132a to 132c is different from each other resulting in a difference in the light emitting time, i.e., the amount of emitted light between the LEDs 133a to 133c. Thus, the color of the pixel is decided by combining a plurality of different amounts of emitted light. Here, note that when all of the LEDs 133a to 133c emit the same amount of light, three primary colors of red, green and blue are mixed equally resulting in white light emission from the pixel.

Contrary to the above-mentioned case, when the simple display flag is set at step 11, the system controller 12 proceeds to step 12, and then determines the data display processing to be performed after step 12 (step 12). The display processing to be performed is specified by entering the related commands through a keyboard or function key in the operation input unit 16. In some cases, the data display processing to be performed is specified by the display processing command included in transmitting/receiving data. After those specifying operations, the system controller 12 interprets such specifying commands and decides which display processing should be performed.

For example, assume that the data display processing is going to be performed only for displaying the character data or text data such as a phone dial number stored in the RAM of the memory unit 17, or a delivered message by a message delivering service through email. In this case, a full-color display applied to such data using a plurality of colors is less meaningful. Therefore, when this data is to be displayed on the data display unit 13, the system controller 12 decides to perform a simple display only in monochrome (step 14).

In this case, the pixel display control circuit 130 shown in FIG. 2 performs the control operation so that the only predetermined FET is selected by the control signal from the system controller 12. Therefore, the trigger pulse is supplied only to the base terminal of the transistor connected to the FET that is selected by the control signal from the system controller 12, resulting in light emission only from the LED connected to the collector of the transistor. For example, when the system controller 12 selects and turns on only the FET 131b while turning off the other FETs, the clock pulse $\phi 2$ out of the three phase clock, $\phi 1 \sim \phi 3$, is supplied only to the base of the transistor 132b. Following this operation, only the transistor 132b is turned on by the clock pulse $\phi 2$ and then only the LED 133b emits light resulting in green light emission from the pixel described in FIG. 2.

In this case, only the LED 133b and the transistor 132b are turned on. Therefore, the electric power consumed with this display operation is approximately one third of that consumed at the time of white light emission when the three LEDs are turned on.

In this embodiment, various monochrome displays are available by selecting one LED from a number of LEDs resulting in one colored-light emission from the selected LED. For example, when the message delivered by the delivery service through email is to be displayed in monochrome, it is displayed in red. In addition, when the phone number stored in the apparatus is to be displayed in monochrome, it is displayed in blue. As explained in the above examples of the simple display, one color out of three colors may be preferably selected for one data display and is switched to any one of the other colors for the other data display when the other data is to be displayed. By establishing such correspondence between the data display and the color of the monochrome display, the user of the apparatus can intuitively understand what kind of data is being displayed on the display screen at a glance at the data display unit 13. This correspondence in the portable information terminal apparatus is convenient for users.

Furthermore, the monochrome display applied to each data display may be specified by the user entering commands through the keyboard or the function key of the operation input unit 16.

It should be noted that if the correspondence of the data display to the color of the monochrome display is not needed, the following display methods may be available. That is, in general, an LED should be used so as not to deteriorate by continuous use of one specified LED for one specified data display. For that reason, the LED used for the simple display in monochrome may be switched to any one of the other LEDs in a cycle of several hours to several days by using the software timer (not shown) integrated into the system controller 12.

At step 12, when the system controller 12 determines that the full-color display needs to be displayed using a plurality of colors on the data display unit, the control proceeds to step 13 so that the regular display processing is performed using a plurality of colors. Situations where a full-color display needs to be performed include when the apparatus is connected to the Internet to receive such delivered data as an image or a photograph, and then displays the data, and when displaying the image data downloaded from a personal computer connected to the apparatus.

Another embodiment of the circuit diagram of the data display unit 13 per pixel will be described with reference to FIG. 4.

Figure 4:
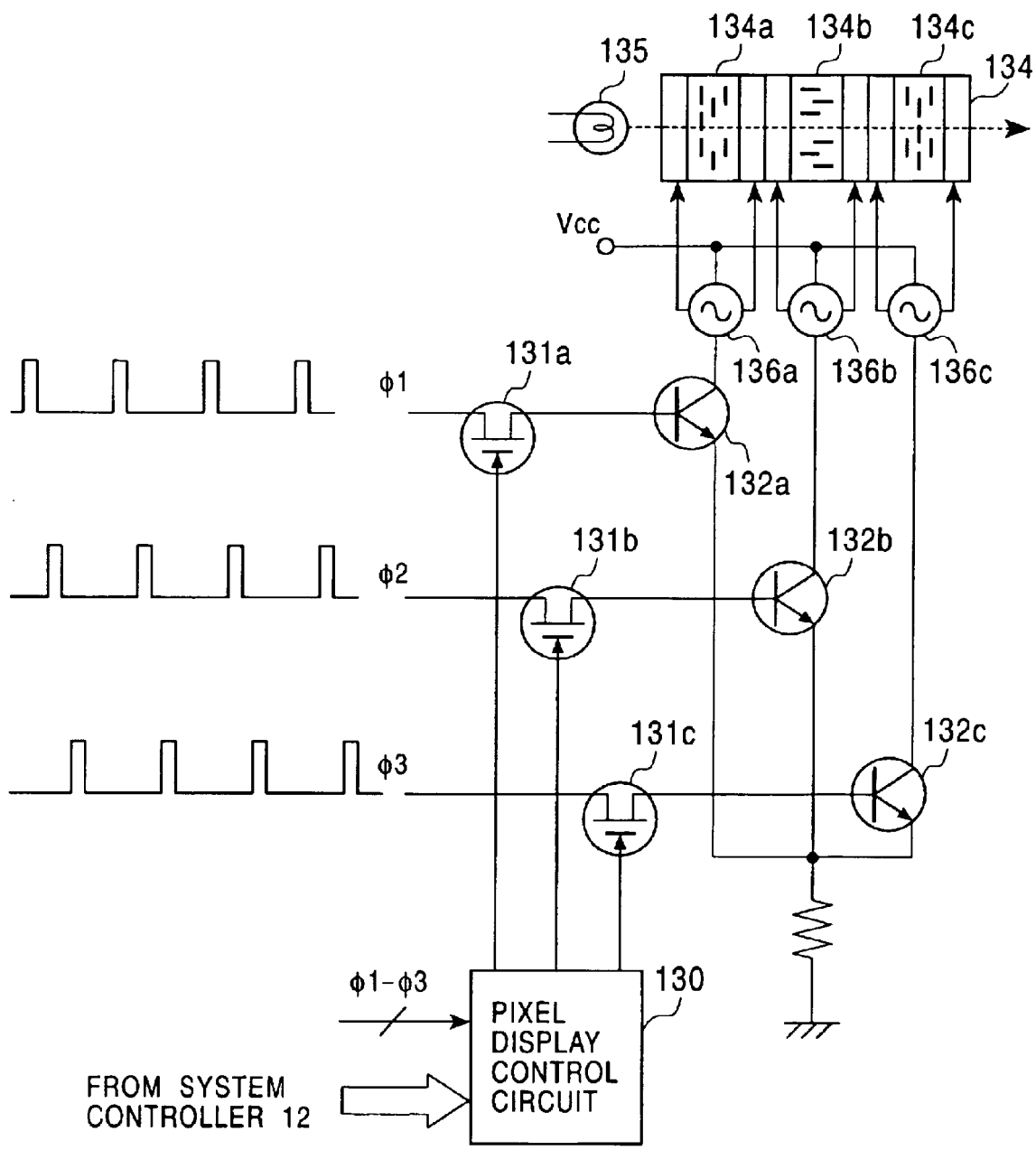
FIG. 4 is a circuit diagram of a pixel constituting the data display unit 13 of another embodiment of the apparatus shown in FIG. 1, partly shown in a block diagram.

Referring to FIG. 4, a lamp 135 is a light source used as a back-light in a light transmissive liquid crystal cell. A liquid crystal element 134 is a liquid crystal cell constituting a pixel of the display. In more detail, the liquid crystal elements 134a to 134c constituting the liquid crystal cell are light transmissive liquid crystal filters or light transmissive liquid crystal shutters. These liquid crystal filters or liquid crystal shutters 134a to 134c are driven by drive electric power sources 136a to 136c respectively. By this operation in the liquid crystal elements, the color display for a pixel can be performed in the colors combined by additive color mixing or subtractive color mixing.

Furthermore, transistors 132a to 132c drive the drive electric power sources 136a to 136c respectively. FETs 131a to 131c supply the three phase clock, $\phi1$~$\phi3$, as trigger pulses to the base terminals of the transistors 132a to 132c respectively. With the reception of control signal from the system controller 12, a pixel display control circuit 130 controls the switching operation of each FET in synchronism with the three phase clock, $\phi1$~$\phi3$.

Referring to the same circuit diagram, the operation for performing a multi-color display at step 13 of the flow chart in FIG. 3 will be described below. In this case, the trigger pulses are supplied to the transistors 132a to 132c at different respective pulse intervals in accordance with the control signal from the system controller 12. This operation makes the driving time of each liquid crystal element different from each other resulting in the determination of the color of light emitted from the pixel.

Next, the operation for performing a monochrome display at step 14 will be described. In this case, the pixel display control circuit 130 turns on only a predetermined FET out of the FETs 131a to 131c in accordance with the control signal from the system controller 12. That is, only the transistor connected to the predetermined FET is turned on. Thus, the color of light emitted from the pixel described in FIG. 4 consists only of the color of the liquid crystal element driven by the turned-on transistor.

As described above, according to the present invention, by utilizing only one display unit and switching the display as necessary between multi-color display and monochrome display, the most preferable display can be achieved. Therefore, the compactness of a portable information terminal apparatus can be achieved. In addition, a portable terminal information apparatus capable of displaying in full-color with decreased electric power consumption can be provided.

It is understood that the foregoing description and accompanying drawings set forth the preferred embodiments of the invention at the present time. Various modification, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

This application is base on a Japanese Patent Application No.2000-232710 which is hereby incorporated by reference.

What is claimed is:

1. A portable information terminal apparatus comprising:
    a communication part for transmitting and receiving signals by utilizing a radio channel;
    a display mode selection part for selecting a display mode in which contents of data contained in said signals are capable if being displayed with a plurality of display colors;
    a display color selection part for selecting an allowable number of the display colors to be used, when said contents of data are displayed in accordance with a selection result by said display mode selection part; and
    a data display part for displaying said contents of data in the display mode selected by said display mode selection part, and with the selected allowable number of the display colors selected by said display color selection part.

2. The portable information terminal apparatus according to claim 1, wherein said display color selection part selects at least one kind of the display colors, when the display mode for said contents of data selected by said display mode selection part is set to a display mode other than for an image data.

3. The portable information terminal apparatus according to claim 1, wherein said data display part comprises light emitting elements, each having a color different from each other, constituting a pixel of a display screen, and a drive circuit to drive said light emitting elements.

4. The portable information terminal apparatus according to claim 2, wherein said data display part comprises light emitting elements, each having a color different from each other, constituting a pixel of a display screen, and a drive circuit to drive said light emitting elements.

5. The portable information terminal apparatus according to claim 1, wherein said data display part utilizes a display unit being selectively switched between multi-color display and monochrome display modes for displaying said contents of data while conserving electric power.

* * * * *

UNITED STATES PATENT AND TRADEMARK OFFICE
CERTIFICATE OF CORRECTION

PATENT NO. : 6,943,806 B2
APPLICATION NO. : 09/919611
DATED : September 13, 2005
INVENTOR(S) : Kiyoshi Iwai It is certified that error appears in the above-identified patent and that said Letters Patent is hereby corrected as shown below:

Claim 1, column 6, line 33, please delete "capable if" and insert -- capable of --.

Signed and Sealed this

Fifth Day of September, 2006

JON W. DUDAS
*Director of the United States Patent and Trademark Office*